(12) United States Patent
Shahana

(10) Patent No.: US 12,037,081 B2
(45) Date of Patent: Jul. 16, 2024

(54) REAR DERAILLEUR

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/557,682

(22) Filed: Dec. 21, 2021

(65) Prior Publication Data
US 2022/0204134 A1    Jun. 30, 2022

(30) Foreign Application Priority Data

Dec. 31, 2020   (TW) .................................. 109147017

(51) Int. Cl.
*B62M 9/125*    (2010.01)
*B62M 9/124*    (2010.01)
*B62M 9/1242*    (2010.01)

(52) U.S. Cl.
CPC ............ *B62M 9/125* (2013.01); *B62M 9/124* (2013.01); *B62M 9/1242* (2013.01); *B62M 2009/12406* (2013.01)

(58) Field of Classification Search
CPC .......... F16H 9/125; F16H 9/126; F16H 9/121; F16H 9/124; F16H 9/1242; F16H 2009/12406
See application file for complete search history.

(56) References Cited

U.S. PATENT DOCUMENTS

| | | | | |
|---|---|---|---|---|
| 4,690,663 A * | 9/1987 | Nagano | ................... | B62M 9/125 474/80 |
| 5,931,753 A * | 8/1999 | Ichida | ................... | B62M 9/1244 474/82 |
| 6,287,228 B1 * | 9/2001 | Ichida | ................... | B62M 25/02 474/82 |
| 7,033,294 B2 * | 4/2006 | Chamberlain | ........... | B62J 13/00 474/80 |
| 7,090,603 B2 * | 8/2006 | Shahana | ................ | B62M 9/125 474/80 |
| 7,166,048 B2 * | 1/2007 | Shahana | ................... | B62J 23/00 474/82 |

(Continued)

FOREIGN PATENT DOCUMENTS

DE    10 2020 112 683 A1    11/2020
DE    10 2020 132 208 A1    6/2021

*Primary Examiner* — Michael R Mansen
*Assistant Examiner* — Raveen J Dias
(74) *Attorney, Agent, or Firm* — Global IP Counselors, LLP

(57) ABSTRACT

A bracket device is configured to mount a bicycle rear derailleur on a rear-wheel axis of a bicycle. The bracket device includes a frame attachment end for coupling to a bicycle frame and a derailleur attachment end for coupling to the bicycle rear derailleur. The frame attachment end has a first arm and a second arm, which are spaced apart in an axial direction with respect to the rear-wheel axis. The first arm has a first attachment opening through which the rear-wheel axis coaxially passes in a mounting state of the bracket device. The second arm has a second attachment opening through which the rear-wheel axis coaxially passes in the mounting state of the bracket device. The derailleur attachment end has a third attachment opening configured to receive a derailleur fastener for coupling to the base element of the bicycle rear derailleur.

18 Claims, 11 Drawing Sheets

(56) References Cited

U.S. PATENT DOCUMENTS

| | | | |
|---|---|---|---|
| 7,189,172 B2* | 3/2007 | Shahana | B62M 9/125 474/80 |
| 7,207,914 B2* | 4/2007 | Chamberlain | B62M 9/128 474/144 |
| 7,614,972 B2* | 11/2009 | Oseto | B62M 9/1244 474/82 |
| 7,905,804 B2* | 3/2011 | Yamaguchi | B62M 9/125 474/80 |
| 8,419,573 B2* | 4/2013 | Yamaguchi | B62M 9/127 267/155 |
| 11,230,350 B2* | 1/2022 | Braedt | B62M 9/125 |
| 11,401,006 B2* | 8/2022 | Braedt | B62M 9/126 |
| 2004/0110586 A1* | 6/2004 | Shahana | B62J 23/00 474/80 |
| 2004/0110587 A1* | 6/2004 | Shahana | B62J 23/00 474/82 |
| 2004/0116222 A1* | 6/2004 | Shahana | B62M 9/125 474/82 |
| 2004/0254038 A1* | 12/2004 | Chamberlain | B62M 9/128 474/82 |
| 2006/0172831 A1* | 8/2006 | Wen | B62M 9/128 474/82 |
| 2006/0189424 A1* | 8/2006 | Chamberlain | B62M 9/12 474/82 |
| 2007/0021246 A1* | 1/2007 | Shahana | B62M 9/126 474/82 |
| 2007/0026985 A1* | 2/2007 | Yamaguchi | B62M 9/126 474/82 |
| 2007/0191160 A1* | 8/2007 | Chamberlain | B62J 23/00 474/82 |
| 2008/0064544 A1* | 3/2008 | Yamaguchi | B62M 9/125 474/82 |
| 2016/0039494 A1* | 2/2016 | Mikesell | B62K 3/02 474/82 |
| 2018/0265169 A1 | 9/2018 | Braedt | |
| 2019/0291818 A1* | 9/2019 | Braedt | B62M 9/12 |
| 2019/0322333 A1* | 10/2019 | Braedt | B62M 9/125 |
| 2020/0062343 A1* | 2/2020 | Braedt | B62M 9/125 |
| 2020/0298933 A1* | 9/2020 | Braedt | B62M 9/1242 |
| 2020/0339220 A1* | 10/2020 | Boehm | B62M 9/1242 |
| 2021/0188396 A1* | 6/2021 | Braedt | B62K 25/02 |
| 2022/0177075 A1* | 6/2022 | Braedt | B62M 9/125 |
| 2022/0204135 A1* | 6/2022 | Shahana | B62M 9/125 |
| 2023/0102982 A1* | 3/2023 | Liao | B62K 25/02 474/80 |

* cited by examiner

REAR DERAILLEUR

CROSS-REFERENCE TO RELATED APPLICATIONS

This application claims priority to Taiwanese Patent Application No. 109147017, filed on Dec. 31, 2020. The entire disclosure of Taiwanese Patent Application No. 109147017 is hereby incorporated herein by reference.

BACKGROUND

Technical Field

The present disclosure generally relates to a bracket device for coupling a bicycle rear derailleur.

Background Information

A rear derailleur is an external gear changing device that is configured to change a transmission ratio of a bicycle. U.S. Patent Application Publication No. 2018/0265169 (Patent Document 1) discloses an example of a typical rear derailleur.

SUMMARY

There is still room for improvement in the usability of the rear derailleur disclosed in Patent Document 1. An objective of the present disclosure is to provide a bracket device for coupling a rear derailleur with improved usability.

A bracket device in accordance with a first aspect of the present disclosure is for mounting a bicycle rear derailleur including a base element, a movable element, and a linkage mechanism on a rear-wheel axis of a bicycle. The bracket device comprises a frame attachment end for coupling to a frame of the bicycle and a derailleur attachment end for coupling to the bicycle rear derailleur. The frame attachment end has a first arm and a second arm. The first arm and the second arm are arranged so as to be spaced apart from each other in an axial direction with respect to the rear-wheel axis. The first arm has a first attachment opening through which the rear-wheel axis coaxially passes in a mounting state of the bracket device. The second arm has a second attachment opening through which the rear-wheel axis coaxially passes in the mounting state of the bracket device. The derailleur attachment end has a third attachment opening configured to receive a derailleur fastener for coupling to the base element of the bicycle rear derailleur. The bracket device according to the first aspect reduces the amount of the rear derailleur projecting from an axial center plane of the bicycle and increases the rigidity of the rear derailleur. Further, the distance between a rear sprocket and the rear derailleur is easily adjusted and thus the usability is improved.

In accordance with a second aspect of the present disclosure, the bracket device according to the first aspect is configured so that the third attachment opening is at least partly disposed between the first attachment opening and the second attachment opening in the axial direction. The bracket device according to the second aspect increases the rigidity of the rear derailleur.

In accordance with a third aspect of the present disclosure, the bracket device according to the second aspect is configured so that the third attachment opening is entirely disposed between the first attachment opening and the second attachment opening in the axial direction. The bracket device according to the third aspect increases the rigidity of the rear derailleur and reduces the weight of the bracket device.

In accordance with a fourth aspect of the present disclosure, the bracket device according to the third aspect is configured so that the second arm is disposed closer to an axial center plane of the bicycle than the first arm in a mounting state of the bicycle rear derailleur. The bracket device according to the fourth aspect reduces the amount of the rear derailleur projecting from an axial center plane of the bicycle.

In accordance with a fifth aspect of the present disclosure, the bracket device according to the third aspect is configured so that the first arm and the second arm are configured to dispose the frame of the bicycle between the first arm and the second arm in the axial direction with respect to the rear-wheel axis in a mounting state of the bicycle rear derailleur. The bracket device according to the fifth aspect reduces the amount of the rear derailleur projecting from an axial center plane of the bicycle and increases the rigidity of the rear derailleur.

In accordance with a sixth aspect of the present disclosure, the bracket device according to the third aspect further comprises a frame fastener element configured to fix the frame attachment end to the frame of the bicycle such that a fastener center axis of the frame fastener element and the rear-wheel axis are coaxial in a mounting state of the bicycle rear derailleur. The bracket device according to the sixth aspect increases the rigidity of the rear derailleur. Also, the rear derailleur is easily attached to and detached from the frame.

In accordance with a seventh aspect of the present disclosure, the bracket device according to the sixth aspect is configured so that the frame fastener element has a tubular portion and a radially projecting portion with respect to the fastener center axis. The radially projecting portion extends radially outwardly from one axial end of the tubular portion with respect to the fastener center axis. The bracket device according to the seventh aspect increases the rigidity of the rear derailleur. Also, the rear derailleur is easily attached to and detached from the frame.

In accordance with an eighth aspect of the present disclosure, the bracket device according to the seventh aspect is configured so that the first attachment opening is configured such that the tubular portion of the frame fastener element passes through. The bracket device according to the eighth aspect increases the rigidity of the rear derailleur. Also, the rear derailleur is easily attached to and detached from the frame.

In accordance with a ninth aspect of the present disclosure, the bracket device according to the eighth aspect is configured so that the second attachment opening is configured such that the tubular portion of the frame fastener element at least partly passes through. The bracket device according to the ninth aspect increases the rigidity of the rear derailleur. Also, the rear derailleur is easily attached to and detached from the frame.

In accordance with a tenth aspect of the present disclosure, the bracket device according to the third aspect further comprises an angular position adjustment structure configured to adjust an angular position of the bracket device with respect to the frame of the bicycle. The bracket device according to the tenth aspect allows for easy adjustment of the orientation of the rear derailleur with respect to the frame by adjusting the orientation of the bracket device relative to the frame.

In accordance with an eleventh aspect of the present disclosure, the bracket device according to the tenth aspect is configured so that the angular position adjustment structure includes a bolt member having a first threaded portion and an adjustment opening having a second threaded portion that threadedly engages with the first threaded portion. The bracket device according to the eleventh aspect allows for easy adjustment of the orientation of the rear derailleur with respect to the frame.

The present disclosure provides the bracket device with improved usability.

BRIEF DESCRIPTION OF THE DRAWINGS

Referring now to the attached drawings which form a part of this original disclosure.

DETAILED DESCRIPTION OF EMBODIMENTS

Figure 1:
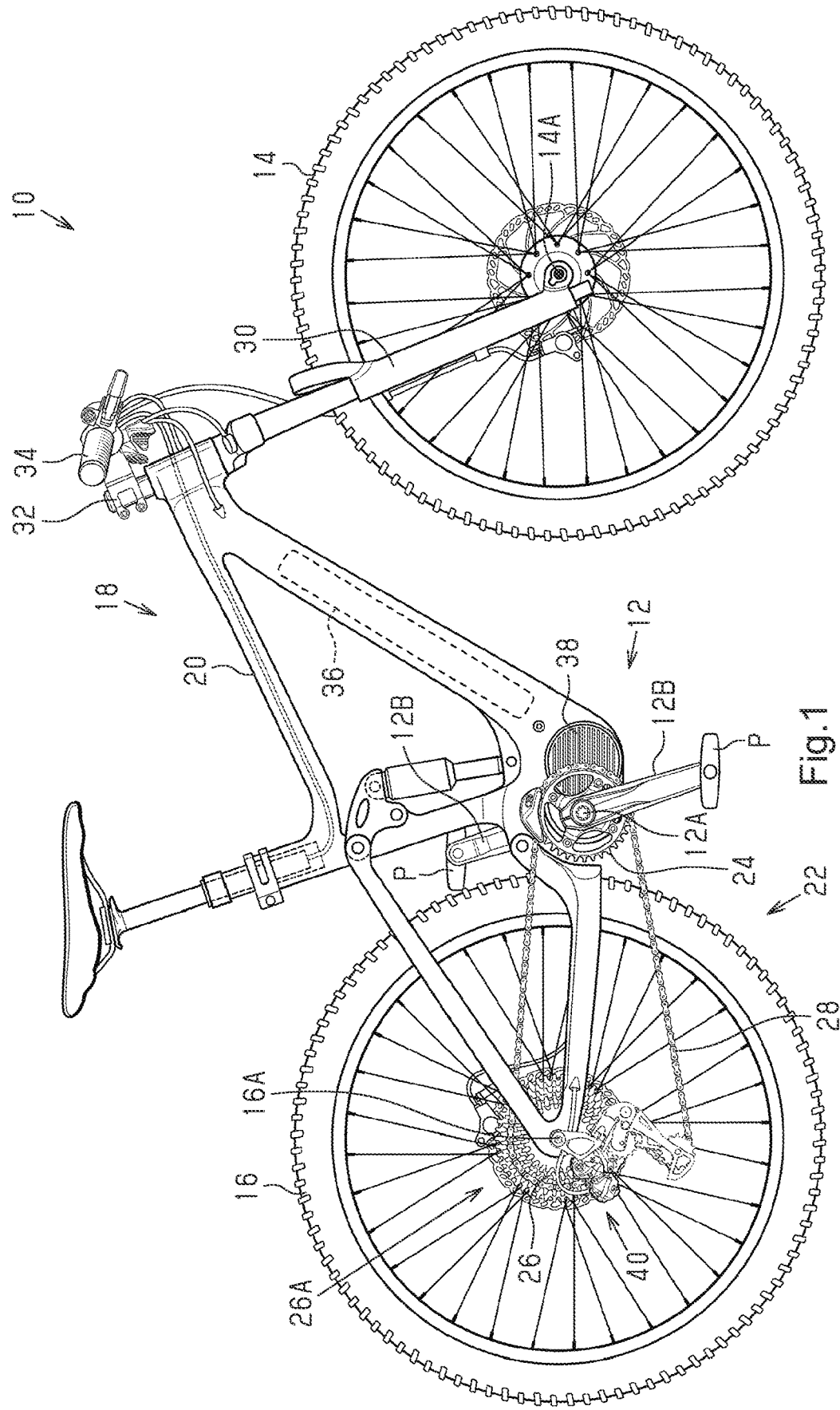
FIG. 1 is a side elevational view of a bicycle including a rear derailleur in accordance with a first embodiment.
Figure 2:
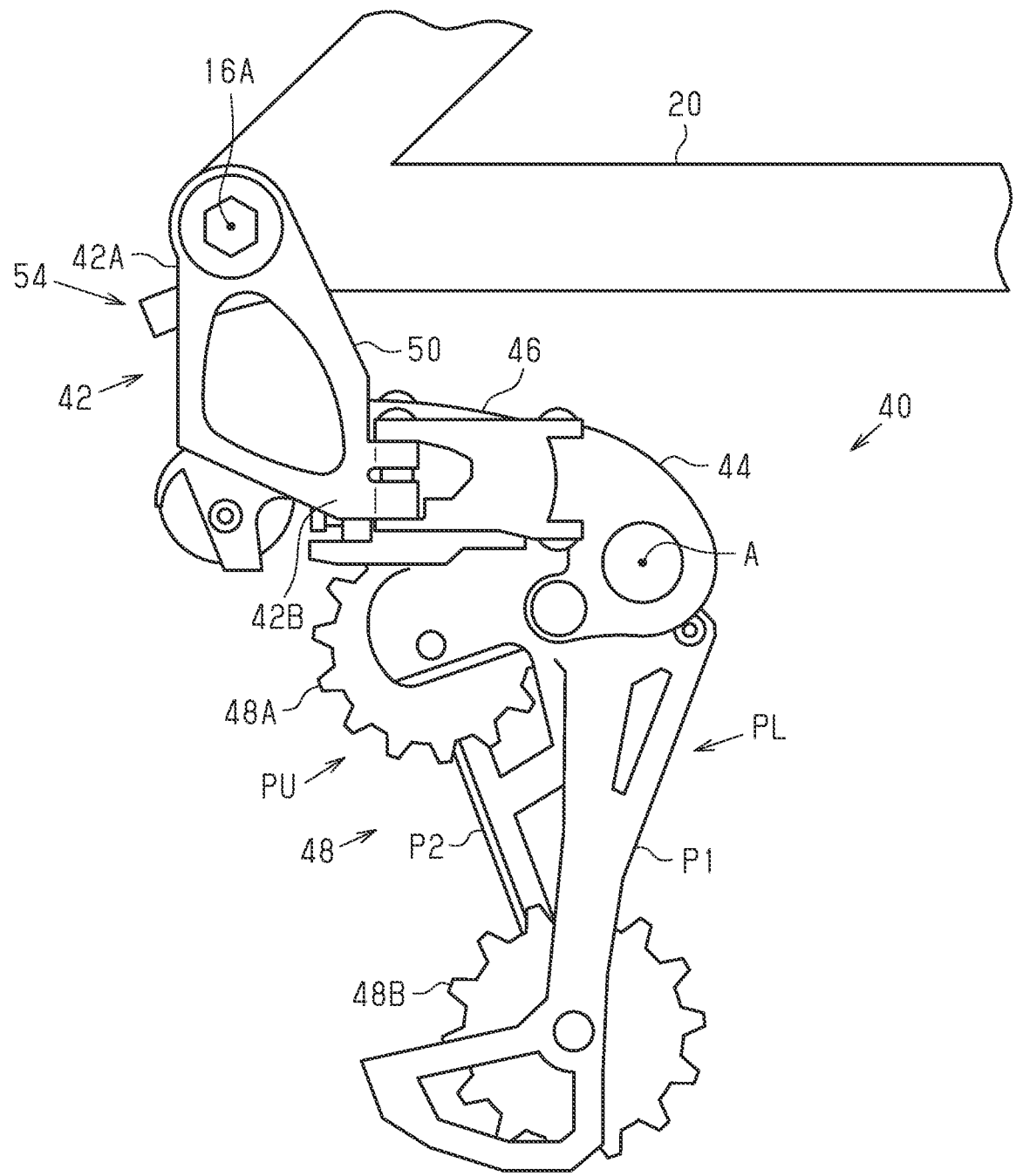
FIG. 2 is an enlarged view showing part of the rear derailleur shown in FIG. 1.

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

A bicycle rear derailleur 40 in accordance with a first embodiment will now be described with reference to FIGS. 1 to 8. A bicycle 10 is a vehicle that can be driven by at least a human driving force. There is no limit to the number of wheels of the bicycle 10. For example, the bicycle 10 can be a unicycle or a vehicle having three or more wheels. Examples of the bicycle 10 include various types of bicycles such as a mountain bike, a road bike, a city bike, a cargo bike, and a recumbent bicycle. The bicycle 10 can be an electric bicycle (E-bike). An electric bicycle includes an electric assist bicycle that assists in propulsion of the vehicle with an electric motor.

The bicycle 10 includes a crank 12, a front wheel 14, a rear wheel 16, and a vehicle body 18. The vehicle body 18 includes a frame 20. The crank 12 includes a crank axle 12A and two crank arms 12B. The crank axle 12A is rotatably supported by the frame 20. The two crank arms 12B are respectively provided on two axial ends of the crank axle 12A. Two pedals P are connected to the two crank arms 12B, respectively. The rear wheel 16 is driven by the rotation of the crank 12. The rear wheel 16 is supported by the frame 20. The crank 12 is connected to the rear wheel 16 by a drive mechanism 22. The drive mechanism 22 includes a front sprocket 24 connected to the crank axle 12A. The crank axle 12A can be connected to the front sprocket 24 by a first one-way clutch. The first one-way clutch is configured to rotate the crank 12 forward in a case where the front sprocket 24 is rotated forward and configured not to rotate the front sprocket 24 rearward in a case where the crank 12 is rotated rearward. There are one or more of the front sprockets 24. More than one front sprockets 24 form a front sprocket assembly. The drive mechanism 22 further includes a rear sprocket 26 and a chain 28. The chain 28 transmits the rotational force of the front sprocket 24 to the rear sprocket 26. The drive mechanism 22 includes more than one rear sprockets 26. The rear sprockets 26 form a rear sprocket assembly 26A.

The rear sprocket 26 is coupled to the rear wheel 16. Preferably, a second one-way clutch is provided between the rear sprocket 26 and the rear wheel 16. The second one-way clutch is configured to rotate the rear wheel 16 forward in a case where the rear sprocket 26 is rotated forward and configured not to rotate the rear wheel 16 rearward in a case where the rear sprocket 26 is rotated rearward.

The front wheel 14 is attached to the frame 20 by a front fork 30. A handlebar 34 is connected to the front fork 30 by a stem 32. In the present embodiment, the rear wheel 16 is connected to the crank 12 by the drive mechanism 22. Alternatively, at least one of the rear wheel 16 and the front wheel 14 can be connected to the crank 12 by the drive mechanism 22.

The bicycle 10 can include a bicycle battery 36. The battery 36 includes one or more battery cells. Each battery cell includes a rechargeable battery. The battery 36 supplies electric power to an assist motor 38. Preferably, the battery 36 is connected to the assist motor 38 in a manner allowing for communication through wired communication. The assist motor 38 is configured to establish communicate with a controller through, for example, power line communication (PLC).

The bicycle 10 can include the assist motor 38 that applies propulsion force to the bicycle 10. The assist motor 38 includes one or more electric motors. The assist motor 38 is configured to transmit the rotation to at least one of the front wheel 14 and a power transmission path of the human driving force extending from the pedals P to the rear wheel 16. The power transmission path of the human driving force extending from the pedals P to the rear wheel 16 includes the rear wheel 16. In the present embodiment, the assist motor 38 is provided on the frame 20 of the bicycle 10 and is configured to transmit the rotation to the front sprocket 24. The assist motor 38 and a housing in which the assist motor 38 is provided form a drive unit. Preferably, a one-way clutch is provided in the power transmission path between the assist motor 38 and the crank axle 12A so that the assist motor 38 is not rotated by the rotational force of the crank 12 in a case where the crank axle 12A is rotated in the direction in which the bicycle 10 moves forward. In a case where at least one of the rear wheel 16 and the front wheel 14 includes the assist motor 38, the assist motor 38 can include a hub motor. The bicycle 10 does not have to include the assist motor 38.

The bicycle 10 includes the rear derailleur 40. The rear derailleur 40 is configured to change a transmission ratio, which is the ratio of the rotational speed of the rear wheel 16 to the rotational speed of the crank 12. The rear derailleur 40 is configured to change the transmission ratio of the rotational speeds of the front sprocket 24 and the rear sprocket 26 that are rotated in cooperation by the chain 28. The rear derailleur 40 moves the chain 28 from one rear sprocket 26 to another rear sprocket 26 of the rear sprocket assembly 26A. In a case where the front sprockets 24 form a front sprocket assembly, the bicycle 10 further includes a front derailleur. The rear derailleur 40 includes a base element 42 configured to be coupled to the frame 20 of the bicycle 10. The rear derailleur 40 includes a movable element 44 configured to be movably arranged relative to the base element 42. The rear derailleur 40 includes a link mechanism 46 movably connecting the movable element 44 to the base element 42. The rear derailleur 40 includes a chain guide arrangement 48 rotatably connected to the movable element 44 about the rotational axis A. The base element 42 includes a first attachment end 42A and a second attachment end 42B. The second attachment end 42B is configured to be coupled to the link mechanism 46. The first attachment end 42A includes at least one arm. The at least one arm includes a first arm 50. The at least one arm includes the first arm 50 and a second arm 52. The first arm 50 and the second arm 52 are arranged so as to be spaced apart from each other in the axial direction with respect to a rear-wheel axis 16A in a state in which the rear derailleur 40 is mounted on the bicycle 10.

The rear derailleur 40 is coaxially installed on the rear-wheel axis 16A of the bicycle 10. The rear derailleur 40 includes the base element 42 including the first attachment end 42A for coaxial installation on the rear-wheel axis 16A of the bicycle 10 and the second attachment end 42B, the movable element 44 movably arranged relative to the base element 42, the link mechanism 46 connecting the movable element 44 to the base element 42, and the chain guide arrangement 48 rotatably connected to the movable element 44 about the rotational axis A. The first attachment end 42A is coaxially installed on the rear-wheel axis 16A. The second attachment end 42B is disposed at a position offset from the rear-wheel axis 16A.

The chain guide arrangement 48 includes at least one pulley PU. The chain guide arrangement 48 includes at least one plate PL. The chain guide arrangement 48 includes pulleys PU and plates PL. In the present embodiment, the chain guide arrangement 48 includes a first pulley 48A and a second pulley 48B. The chain guide arrangement 48 includes an outer plate P1 and an inner plate P2. The first pulley 48A is a guide pulley that guides the chain 28. The second pulley 48B is a tension pulley that maintains the tension of the chain 28.

The first attachment end 42A of the base element 42 is coupled to the frame 20 of the bicycle 10. The second attachment end 42B is coupled to the link mechanism 46. The first attachment end 42A includes the first arm 50 and the second arm 52. The first arm 50 and the second arm 52 are spaced apart from each other in the axial direction with respect to the rear-wheel axis 16A. The first arm 50 and the second arm 52 are formed integrally with the base element 42.

The base element 42 includes an angular position adjustment structure 54. The angular position adjustment structure 54 is configured to adjust the angular position of the rear derailleur 40 relative to the frame 20 of the bicycle 10 by rotating the first arm 50 and the second arm 52 about the rear-wheel axis 16A. The angular position adjustment structure 54 adjusts the angular position of the rear derailleur 40 by adjusting the angular position of the base element 42 relative to the frame 20. The angular position adjustment structure 54 is disposed between the first attachment end 42A and the second attachment end 42B in a radial direction with respect to the rear-wheel axis 16A.

The angular position adjustment structure 54 includes a bolt member 56 having a first threaded portion 56A and an adjustment opening 58 having a second threaded portion 58A that threadedly engages with the first threaded portion 56A. The first threaded portion 56A includes, for example, an external thread portion. The second threaded portion 58A includes, for example, an internal thread portion. The relative positional relationship of the first threaded portion 56A and the second threaded portion 58A is changed by rotating the bolt member 56. The bolt member 56 includes a head 56B having a structure for rotating the bolt member 56. In an example, the structure is a receptacle socket for receiving a Phillips screwdriver, a slotted screwdriver, or a hex wrench.

Figure 3:
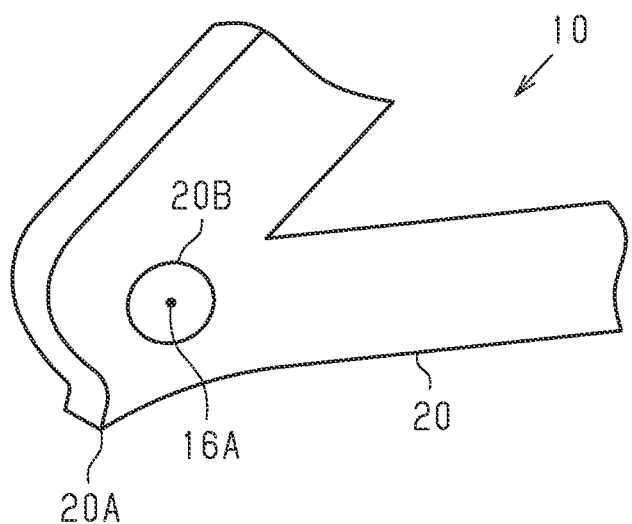
FIG. 3 shows a rear end of a frame of the bicycle.
Figure 4:
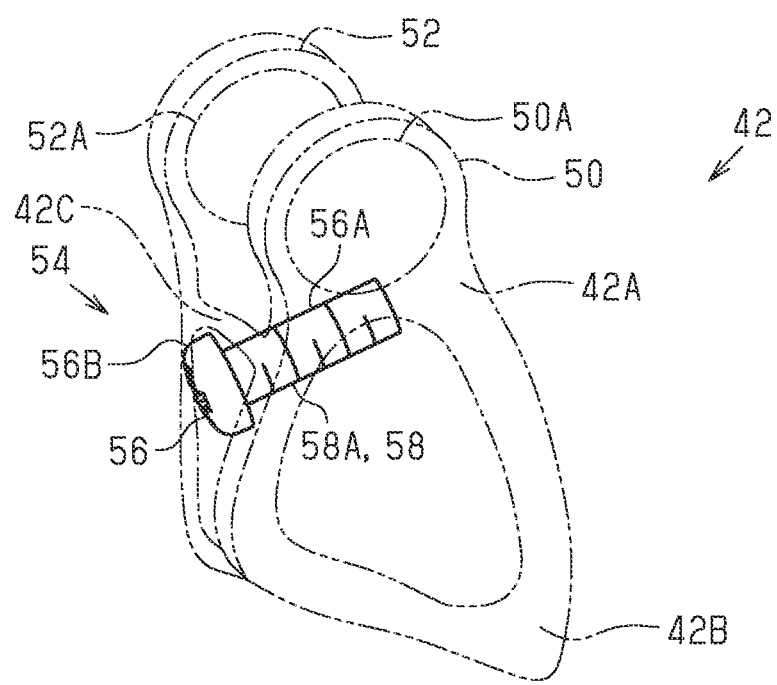
FIG. 4 is a perspective view showing the position of an angular position adjustment structure in a base element.
Figure 5:
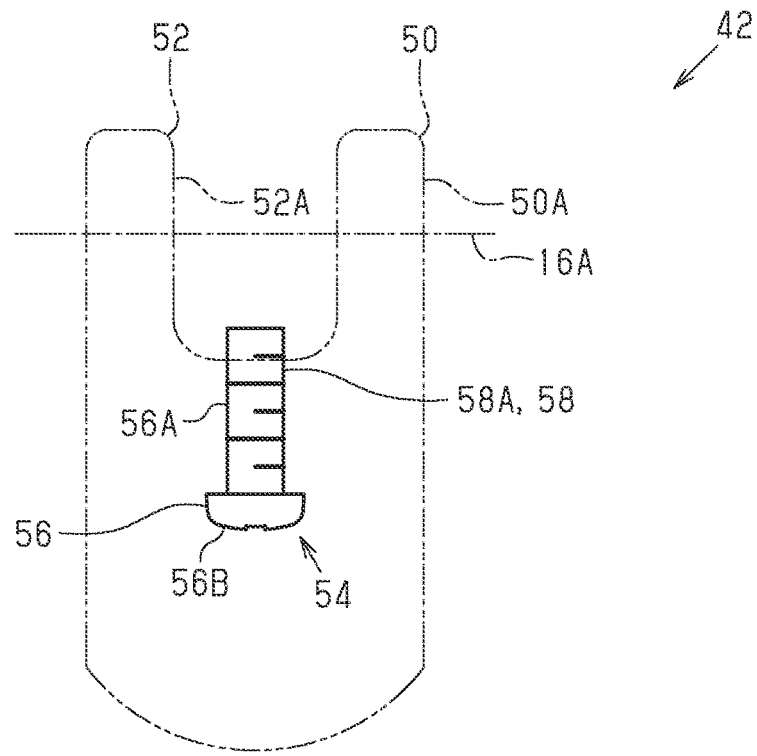
FIG. 5 is a rear view of the angular position adjustment structure in the base element.

A method for adjusting the angular position using the angular position adjustment structure 54 will now be described. As shown in FIG. 3, a contact surface 20A is formed on the rear end of the frame 20 where the rear derailleur 40 is coupled. For example, the contact surface 20A includes a projecting portion. An end of the bolt member 56 contacts the contact surface 20A so as to change and determine the angular position of the rear derailleur 40 relative to the frame 20. For example, the contact surface 20A includes a projecting portion. An end of the first threaded portion 56A contacts the contact surface 20A so as to change and determine the angular position of the rear derailleur 40 relative to the frame 20. The contact surface 20A that contacts the bolt member 56 projects downward with respect to the bicycle 10 from an imaginary line connecting the rear-wheel axis 16A and a front-wheel axis 14A. The end of the bolt member 56 that contacts the contact surface 20A can be formed from a material other than metal. In an example, the end of the bolt member 56 that contacts the contact surface 20A is formed from a resin or an elastomer.

Figure 6:
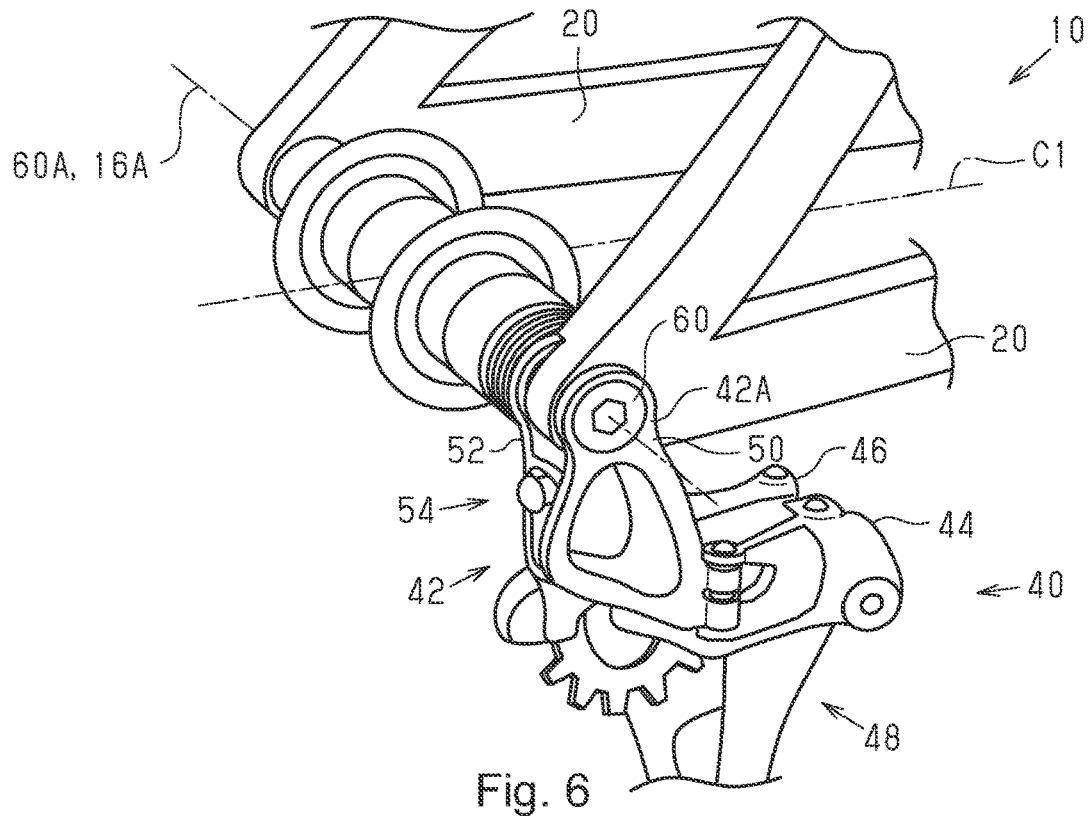
FIG. 6 is an enlarged view showing part of the rear derailleur of FIG. 1 in a mounting state on the frame.

As shown in FIG. 6, in the mounting state of the rear derailleur 40 on the bicycle 10, the first arm 50 and the second arm 52 are arranged such that the frame 20 of the bicycle 10 is disposed between the first arm 50 and the second arm 52 in the axial direction with respect to the rear-wheel axis 16A. The axial direction with respect to the rear-wheel axis 16A corresponds to a sideward direction of the bicycle 10. The first arm 50 of the base element 42 has a first attachment opening 50A through which the rear-wheel axis 16A coaxially passes in the mounting state of the rear derailleur 40 on the bicycle 10. The second arm 52 of the base element 42 has a second attachment opening 52A through which the rear-wheel axis 16A coaxially passes in the mounting state of the rear derailleur 40 on the bicycle 10. The frame 20 has a frame opening 20B through which the rear-wheel axis 16A coaxially passes.

The position where the angular position adjustment structure 54 is disposed in the base element 42 will now be described. The angular position adjustment structure 54 is disposed between the first attachment opening 50A and the second attachment end 42B in the radial direction of the rear-wheel axis 16A. The angular position adjustment structure 54 is disposed between the second attachment opening 52A and the second attachment end 42B in the radial direction of the rear-wheel axis 16A. The angular position adjustment structure 54 is disposed between the first attachment opening 50A and the second attachment opening 52A in the axial direction with respect to the rear-wheel axis 16A. The angular position adjustment structure 54 is disposed on an arm connecting portion 42C connecting the first arm 50 and the second arm 52.

In the mounting state of the rear derailleur 40 on the bicycle 10, the second arm 52 is disposed closer to an axial center plane of the bicycle 10 than the first arm 50. The axial center plane of the bicycle 10 extends along the center axis C1, which extends in the front-rear direction of the bicycle 10. The axial center plane of the bicycle 10 is orthogonal to a line extending in the axial direction of the rear-wheel axis 16A.

The base element 42 further includes a fastener element 60 configured to fix the first attachment end 42A of the base element 42 to the frame 20 of the bicycle 10. In the mounting state of the rear derailleur 40 on the bicycle 10, the center axis 60A of the fastener element 60 is coaxial with the rear-wheel axis 16A. The fastener element 60 has a tubular portion 62 and a radially projecting portion 64 with respect to the center axis 60A of the fastener element 60. The radially projecting portion 64 extends radially outwardly from one axial end of the tubular portion 62 with respect to the center axis 60A of the fastener element 60.

The first arm 50 of the base element 42 has the first attachment opening 50A. The first attachment opening 50A is configured such that the tubular portion 62 of the fastener element 60 passes through. The first attachment opening 50A is disposed such that the rear-wheel axis 16A coaxially passes through the first attachment opening 50A in the mounting state of the rear derailleur 40 on the bicycle 10. The first arm 50 of the base element 42 has the first minimum radial thickness H1 around the first attachment opening 50A with respect to the rear-wheel axis 16A in the mounting state of the rear derailleur 40 on the bicycle 10.

The second arm 52 of the base element 42 has the second attachment opening 52A. The second attachment opening 52A is configured such that the tubular portion 62 of the fastener element 60 at least partly passes through. The second attachment opening 52A is disposed such that the rear-wheel axis 16A coaxially passes through the second attachment opening 52A in the mounting state of the rear derailleur 40 on the bicycle 10. The second arm 52 of the base element 42 has the second minimum radial thickness H2 around the second attachment opening 52A with respect to the rear-wheel axis 16A in the mounting state of the rear derailleur 40 on the bicycle 10.

Figure 7:
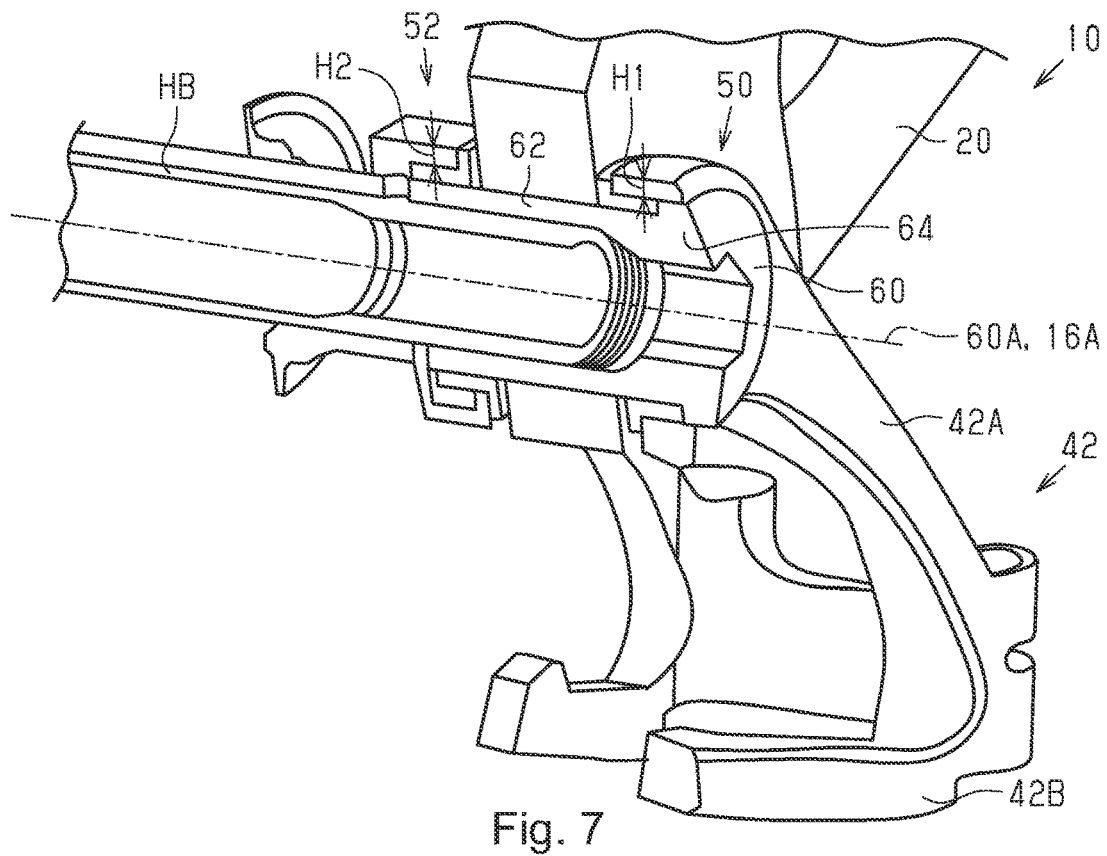
FIG. 7 is a cross-sectional view taken along the center axis shown in FIG. 6.
Figure 8:
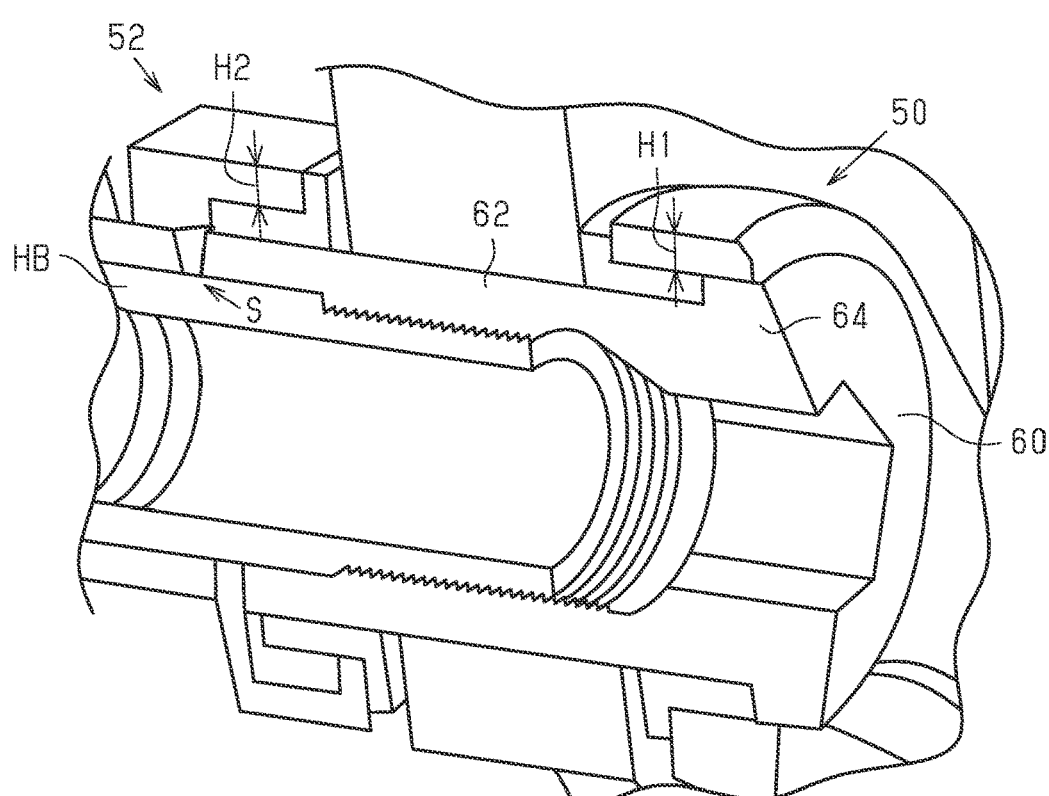
FIG. 8 is an enlarged view showing part of the rear derailleur of FIG. 7.

The first minimum radial thickness H1 and the second minimum radial thickness H2 will now be described. As shown in FIGS. 7 and 8, the first minimum radial thickness H1 is the thickness at the thinnest part of the first arm 50 defining the first attachment opening 50A. The second minimum radial thickness H2 is the thickness at the thinnest part of the second arm 52 defining the second attachment opening 52A.

In an example, at least one of the first minimum radial thickness H1 and the second minimum radial thickness H2 is equal to or larger than 2 mm. Preferably, both of the first minimum radial thickness H1 and the second minimum radial thickness H2 are equal to or larger than 2 mm. In another example, at least one of the first minimum radial thickness H1 and the second minimum radial thickness H2 is equal to or larger than 2.5 mm. Preferably, both of the first minimum radial thickness H1 and the second minimum radial thickness H2 are equal to or larger than 2.5 mm.

A slide portion S is formed on at least one of a contact surface between a rear-wheel hub shaft HB and the base element 42 and a contact surface between the fastener element 60 and the base element 42. In an example, the slide portion S is formed on at least one of a contact surface between the hub shaft HB and the second arm 52 and a contact surface between the second arm 52 and the tubular portion 62.

In the axial direction with respect to the rear-wheel axis 16A, the slide portion S has the thickness of 0.2 mm or greater. The slide portion S is formed from a material differing from that of the fastener element 60, the rear-wheel hub shaft HB, and the base element 42. The slide portion S is formed from a material having low frictional property and superior wear resistance. In an example, the material of the slide portion S is a resin. The slide portion S improves sliding characteristics between components. The resin is, for example, a fluororesin. A fluororesin is, for example, polytetrafluoroethylene or perfluoroalkoxy alkane. The slide portion S can be obtained by performing a surface treatment on a contact surface between the fastener element 60, the rear-wheel hub shaft HB, and the base element 42. In an example, a layer structure is obtained through at least one of an alumite treatment, which coats the contact surface with an oxide layer, and a fluororesin treatment. A fluororesin treatment includes coating the contact surface with fluororesin and applying fluororesin to the contact surface.

The rear derailleur 40 in accordance with the first embodiment further has the following advantages.

A layer structure is formed on at least one of a contact surface between the rear-wheel hub shaft HB and the base element 42 and a contact surface between the fastener element 60 and the base element 42. The layer structure improves the sliding characteristics and reduces wear of the components.

Second Embodiment

Figure 9:
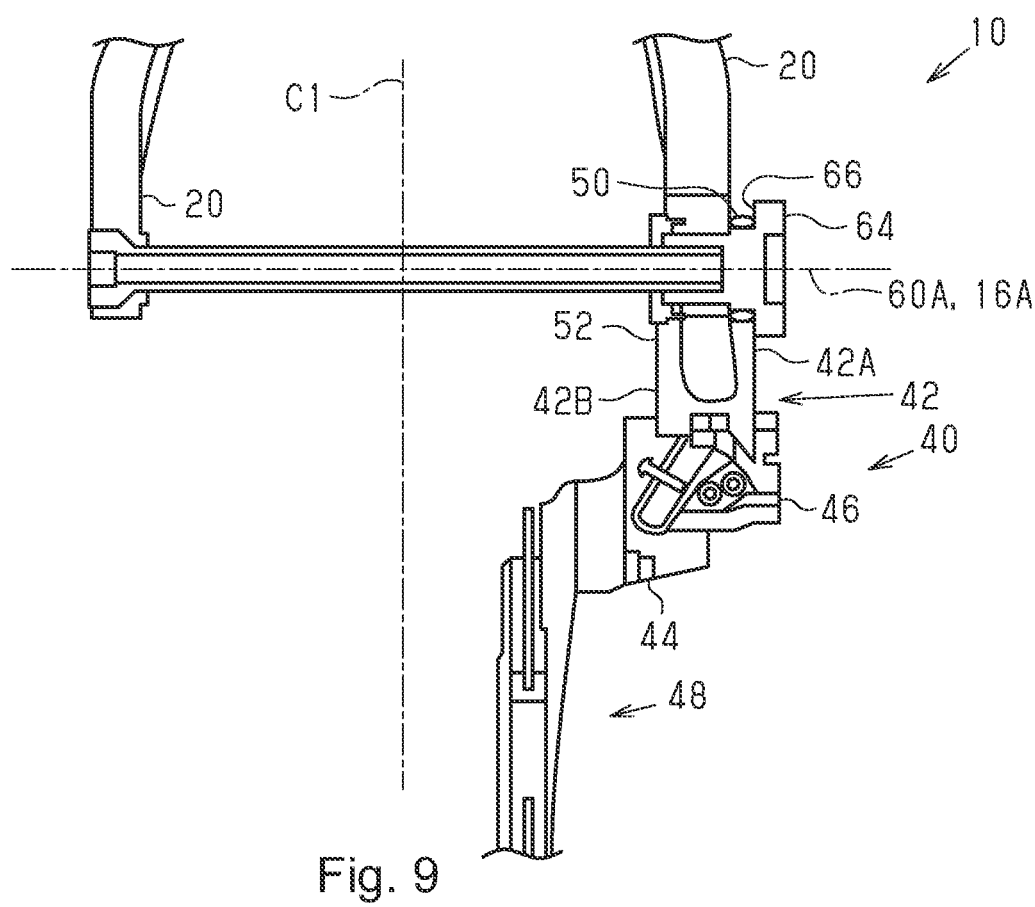
FIG. 9 is a schematic diagram of a rear derailleur in accordance with a second embodiment.

The rear derailleur 40 in accordance with a second embodiment will now be described with reference to FIG. 9. The rear derailleur 40 of the second embodiment is configured in the same manner as the rear derailleur 40 of the first embodiment except for the structure of the fastener element 60. Thus, same reference numerals are given to those components that are the same as the corresponding components of the rear derailleur 40 in accordance with the first embodiment. Such components will not be described in detail.

The rear derailleur 40 in accordance with the second embodiment is the bicycle rear derailleur 40 for coaxial installation on the rear-wheel axis 16A of the bicycle 10. The rear derailleur 40 includes the base element 42 having the first attachment end 42A for coaxial installation on the rear-wheel axis 16A of the bicycle 10 and the second attachment end 42B, the movable element 44 movably arranged relative to the base element 42, the link mechanism 46 connecting the movable element 44 to the base element 42, the chain guide arrangement 48 rotatably connected to the movable element 44 about the rotational axis A, and the fastener element 60 configured to fix the first attachment end 42A of the base element 42 to the frame 20 of the bicycle 10. The second attachment end 42B is coupled to the link mechanism 46. The first attachment end 42A includes the first arm 50 and the second arm 52.

In a mounting state of the rear derailleur 40 on the bicycle 10, the center axis 60A of the fastener element 60 is coaxial with the rear-wheel axis 16A. The fastener element 60 has the tubular portion 62 and the radially projecting portion 64 with respect to the center axis 60A of the fastener element 60. The radially projecting portion 64 extends radially outwardly from one axial end of the tubular portion 62 with respect to the center axis 60A of the fastener element 60. The tubular portion 62 has the radial length that is less than or equal to the radial length of the first attachment opening 50A and the radial length of the second attachment opening 52A. The radially projecting portion 64 has the radial length that is greater than the radial length of the first attachment opening 50A and the radial length of the second attachment opening 52A.

The first arm 50 and the second arm 52 are arranged so as to be spaced apart from each other in the axial direction with respect to the rear-wheel axis 16A. In the mounting state of the rear derailleur 40 on the bicycle 10, the second arm 52 is disposed closer to an axial center plane of the bicycle 10 than the first arm 50. The first arm 50 of the base element 42 has the first attachment opening 50A. The first attachment opening 50A is configured such that the tubular portion 62 of the fastener element 60 passes through.

The first arm 50 is at least partially disposed between the frame 20 and the radially projecting portion 64 of the fastener element 60 in the axial direction with respect to the rear-wheel axis 16A in the mounting state of the rear derailleur 40 on the bicycle 10. In an example, the first arm 50 is entirely disposed between the frame 20 and the radially projecting portion 64 of the fastener element 60 in the axial direction with respect to the rear-wheel axis 16A. The radially projecting portion 64 of the fastener element 60 has a stepped section 66 configured to receive the first arm 50 thereinto in the mounting state of the rear derailleur 40 on the bicycle 10.

The stepped section 66 extends radially outwardly from the tubular portion 62 with respect to the center axis 60A. The stepped section 66 is disposed radially inward from the radially projecting portion 64 with respect to the center axis 60A. The stepped section 66 and the radially projecting portion 64 can be set to differ in the length of projection by any value. In an example, the difference is 0.3 mm or greater. One or more of the stepped sections 66 can be provided. In the present embodiment, a single stepped section 66 extends in a circumferential direction around the center axis 60A. The stepped section 66 can be parallel to the axial direction with respect to the center axis 60A. Alternatively, the stepped section 66 can be tilted relative to the axial direction with respect to the center axis 60A.

Third Embodiment

Figure 10:
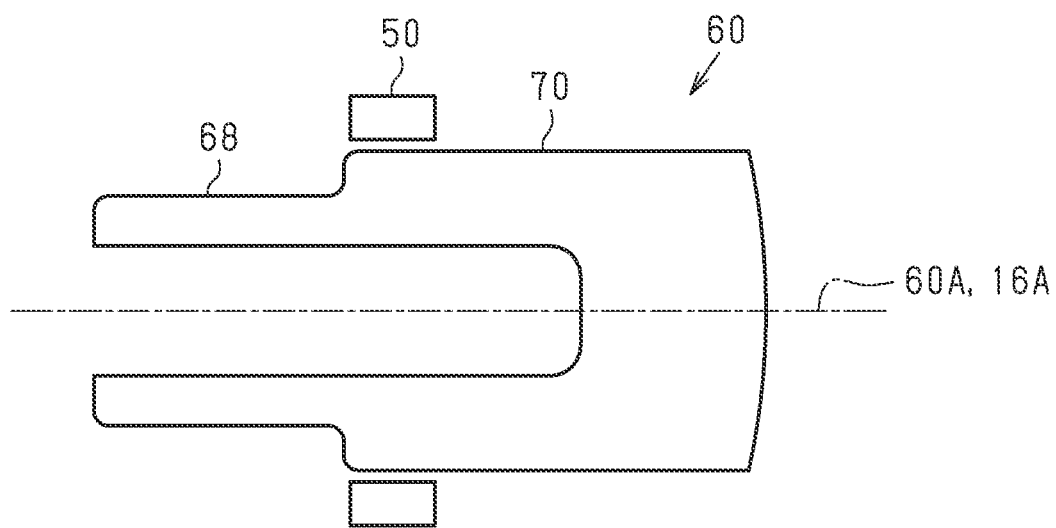
FIG. 10 is a schematic diagram of a rear derailleur in accordance with a third embodiment.

The rear derailleur 40 in accordance with a third embodiment will now be described with reference to FIG. 10. The rear derailleur 40 of the third embodiment is configured in the same manner as the rear derailleur 40 of the first and second embodiments except for the structure of the fastener element 60. Thus, same reference numerals are given to those components that are the same as the corresponding components of the rear derailleur 40 in accordance with the first embodiment. Such components will not be described in detail.

The rear derailleur 40 in accordance with the third embodiment is the bicycle rear derailleur 40 for coaxial installation on the rear-wheel axis 16A of the bicycle 10. The rear derailleur 40 includes the base element 42 having the first attachment end 42A for coaxial installation on the rear-wheel axis 16A of the bicycle 10 and the second attachment end 42B, the movable element 44 movably arranged relative to the base element 42, the link mechanism 46 connecting the movable element 44 to the base element 42, the chain guide arrangement 48 rotatably connected to the movable element 44 about the rotational axis A, and the fastener element 60 configured to fix the first attachment end 42A of the base element 42 to the frame 20 of the bicycle 10.

In a mounting state of the rear derailleur 40 on the bicycle 10, the center axis 60A of the fastener element 60 is coaxial with the rear-wheel axis 16A. The second attachment end 42B is coupled to the link mechanism 46.

The fastener element 60 has a small diameter portion 68 and a large diameter portion 70 adjacent to the small diameter portion 68 in the axial direction with respect to the center axis 60A of the fastener element 60. The first attachment end 42A includes the first arm 50 and the second arm 52, and the first arm 50 and the second arm 52 are arranged so as to be spaced apart from each other in the axial direction with respect to the rear-wheel axis 16A. In the mounting state of the rear derailleur 40 on the bicycle 10, the second arm 52 is disposed closer to an axial center plane of the bicycle 10 than the first arm 50. The first arm 50 of the base element 42 has the first attachment opening 50A. The first attachment opening 50A is configured such that the small diameter portion 68 of the fastener element 60 passes through. The large diameter portion 70 protrudes outward from the small diameter portion 68 in a radial direction with respect to the center axis 60A.

The large diameter portion 70 of the fastener element 60 protrudes from the first arm 50 in the axial direction with respect to the rear-wheel axis 16A in the mounting state of the rear derailleur 40 on the bicycle 10 such that the large diameter portion 70 of the fastener element 60 hits against foreign objects prior to the other parts of the rear derailleur 40 of the bicycle 10. The other parts of the rear derailleur 40 include at least one of the base element 42, the movable element 44, the link mechanism 46, and the chain guide arrangement 48. Foreign objects include, for example, road surfaces, walls, rocks, stones, and trees on the traveling road of the bicycle 10.

In the mounting state of the rear derailleur 40 on the bicycle 10, the large diameter portion 70 of the fastener element 60 protrudes from the first arm 50 in the axial direction with respect to the rear-wheel axis 16A by at least 3 mm. Preferably, the large diameter portion 70 protrudes from the first arm 50 in the axial direction with respect to the rear-wheel axis 16A by 60 mm or less. The length of protrusion of the large diameter portion 70 is selected from, for example, 3 mm, 6 mm, 10 mm, 15 mm, 20 mm, 25 mm, 30 mm, 35 mm, 45 mm, 50 mm, 55 mm, and 60 mm.

Fourth Embodiment

The rear derailleur 40 in accordance with a fourth embodiment will now be described with reference to FIGS.

11 to 14. The rear derailleur 40 of the fourth embodiment is configured in the same manner as the rear derailleur 40 of the first embodiment except for the structure of a bracket device 100. Thus, same reference numerals are given to those components that are the same as the corresponding components of the rear derailleur 40 of the first embodiment. Such components will not be described in detail.

Figure 11:
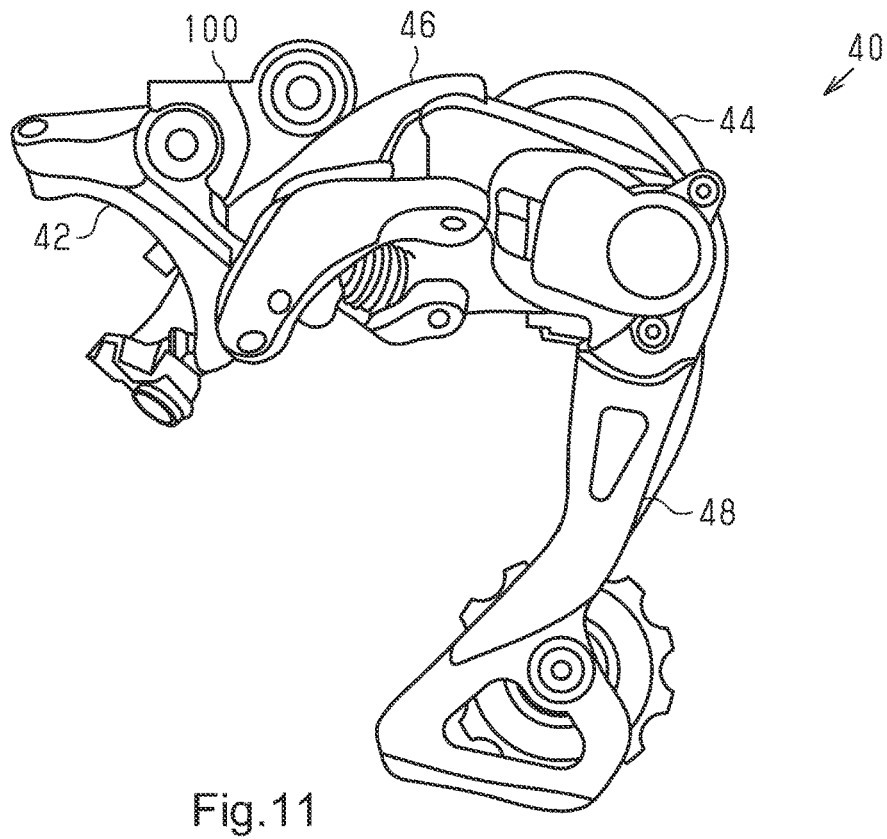
FIG. 11 is a side elevational view of a rear derailleur in accordance with a fourth embodiment.
Figure 12:
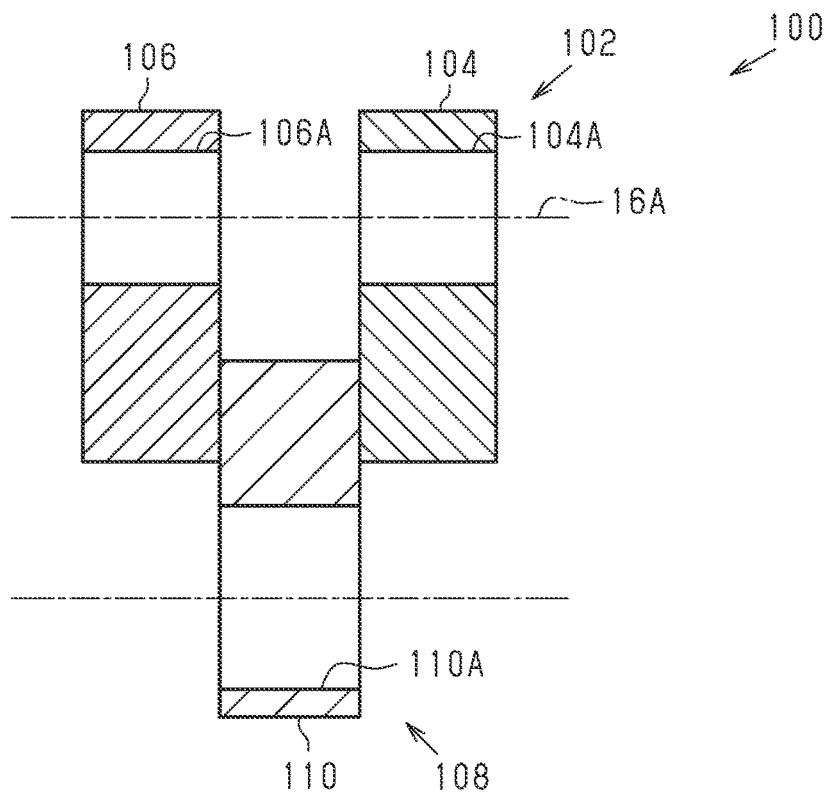
FIG. 12 is a schematic diagram showing the structure of a bracket device shown in FIG. 11.

The bracket device 100 shown in FIG. 11 is for attaching the bicycle rear derailleur 40 including the base element 42, the movable element 44, and the link mechanism 46 to the rear-wheel axis 16A of the bicycle 10. In an example, the bracket device 100 is formed separately from the rear derailleur 40. In a state in which the rear derailleur 40 is mounted on the bicycle 10, the bracket device 100 is disposed between the frame 20 of the bicycle 10 and the base element 42 to couple the base element 42 of the rear derailleur 40 to the frame 20 of the bicycle 10. In a state in which the rear derailleur 40 is mounted on the bicycle 10, the bracket device 100 is disposed between the frame 20 of the bicycle 10 and at least one arm to couple the base element 42 of the rear derailleur 40 to the frame 20 of the bicycle 10.

The bracket device 100 includes a frame attachment end 102 coupled to the frame 20 of the bicycle 10 and a derailleur attachment end 108 coupled to the bicycle rear derailleur 40. The frame attachment end 102 includes a first arm 104 and a second arm 106. The first arm 104 and the second arm 106 are arranged so as to be spaced apart from each other in the axial direction with respect to the rear-wheel axis 16A. The first arm 104 includes a first attachment opening 104A through which the rear-wheel axis 16A coaxially passes in the mounting state of the bracket device 100. The second arm 106 includes a second attachment opening 106A through which the rear-wheel axis 16A passes in the mounting state of the bracket device 100. The bicycle derailleur attachment end 108 includes a third attachment opening 110A configured to receive a derailleur fastener element 112 coupled to the base element 42 of the bicycle rear derailleur 40. The third attachment opening 110A is provided in a third arm 110 of the derailleur attachment end 108.

The third arm 110 is at least partly disposed between the first arm 104 and the second arm 106 in the axial direction. The third attachment opening 110A is at least partly disposed between the first attachment opening 104A and the second attachment opening 106A in the axial direction. In the present embodiment, the third arm 110 is entirely disposed between the first arm 104 and the second arm 106. The third attachment opening 110A is entirely disposed between the first attachment opening 104A and the second attachment opening 106A in the axial direction.

Figure 13:
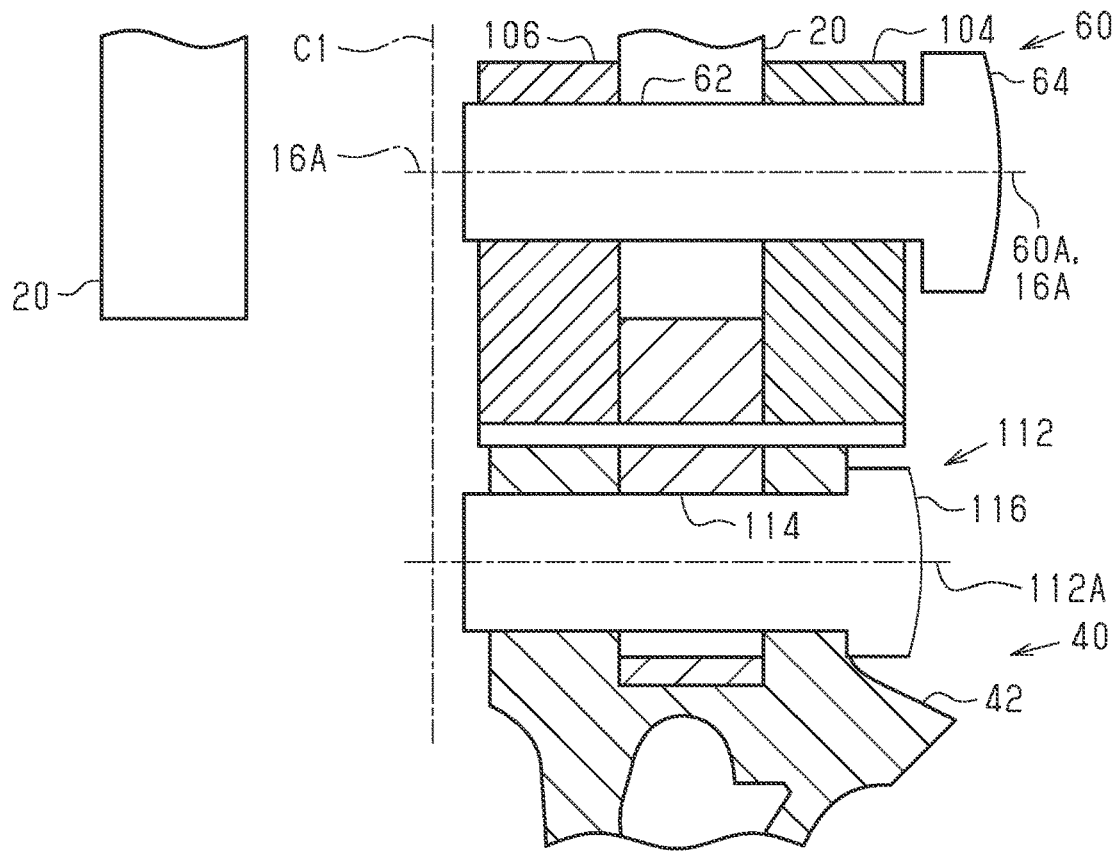
FIG. 13 is a schematic diagram of the structure in which a base element is coupled to the bracket device.
Figure 14:
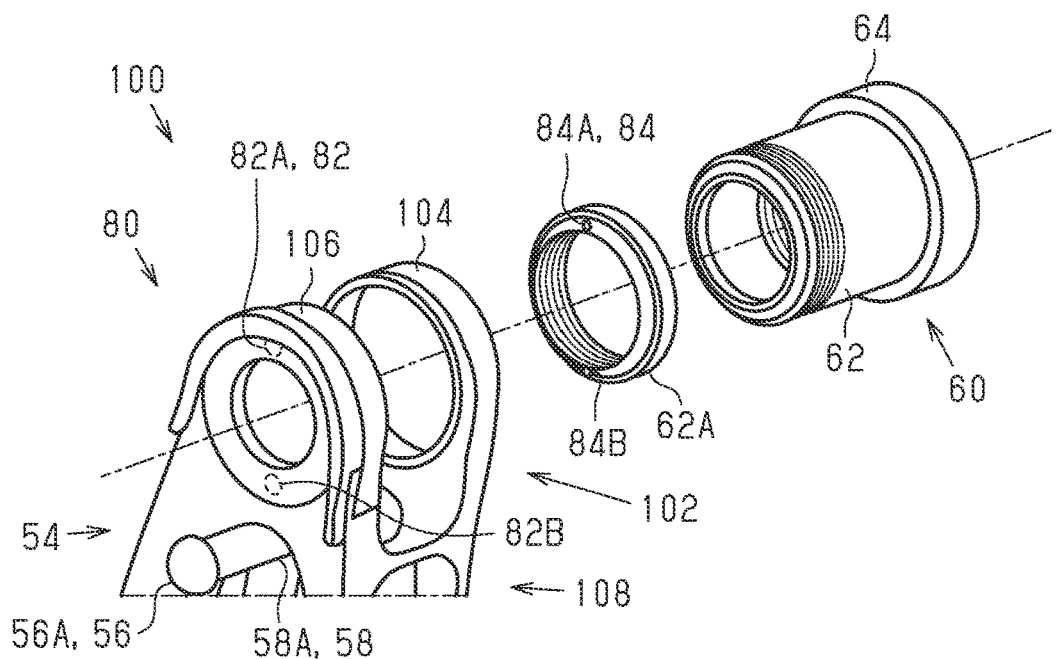
FIG. 14 is an exploded perspective view showing the structure of a base element in accordance with a modification.

FIG. 13 schematically shows a state in which the bicycle rear derailleur 40 is mounted on the bicycle 10 using the bracket device 100 in accordance with the present embodiment. In the mounting state of the bicycle rear derailleur 40 on the bicycle 10, the second arm 106 is disposed closer to an axial center plane of the bicycle 10 than the first arm 104. The axial center plane of the bicycle 10 extends along the center axis C1, which extends in the front-rear direction of the bicycle 10. The axial center plane of the bicycle 10 is orthogonal to a line extending in the axial direction of the rear-wheel axis 16A.

The first arm 104 and the second arm 106 are configured such that the frame 20 of the bicycle 10 is disposed between the first arm 104 and the second arm 106 in the axial direction with respect to the rear-wheel axis 16A in the mounting state of the bicycle rear derailleur 40 on the bicycle 10.

The bracket device 100 further includes the fastener element 60 configured to fix the frame attachment end 102 to the frame 20 of the bicycle 10. In the mounting state of the bicycle rear derailleur 40 on the bicycle 10, the center axis 60A of the fastener element 60 is coaxial with the rear-wheel axis 16A.

The fastener element 60 has the tubular portion 62 and the radially projecting portion 64 with respect to the center axis 60A of the fastener element 60. The radially projecting portion 64 extends radially outwardly from one axial end of the tubular portion 62 of the fastener element 60 with respect to the center axis 60A.

The first attachment opening 104A is configured such that the tubular portion 62 of the fastener element 60 passes through. The second attachment opening 106A is configured such that the tubular portion 62 of the fastener element 60 at least partly passes through.

The derailleur fastener element 112 has a tubular portion 114 and a radially projecting portion 116 with respect to the center axis 112A of the derailleur fastener element 112. The radially projecting portion 116 extends radially outwardly from one axial end of the tubular portion 114 of the derailleur fastener element 112 with respect to the center axis 112A. The third attachment opening 110A is configured such that the tubular portion 114 of the derailleur fastener element 112 at least partly passes.

The bracket device 100 further includes the angular position adjustment structure 54. The angular position adjustment structure 54 is configured to adjust the angular position of the bracket device 100 relative to the frame 20 of the bicycle 10. The angular position adjustment structure 54 includes the bolt member 56 having the first threaded portion 56A and the adjustment opening 58 having the second threaded portion 58A that threadedly engages with the first threaded portion 56A. The angular position adjustment structure 54 adjusts the angular position of the rear derailleur 40 attached to the bracket device 100 by adjusting the angular position of the bracket device 100 relative to the frame 20. The first threaded portion 56A includes, for example, an external thread portion. The second threaded portion 58A includes, for example, an internal thread portion. The relative positional relationship of the first threaded portion 56A and the second threaded portion 58A is changed by rotating the bolt member 56. The first threaded portion 56A contacts the contact surface 20A formed on the frame 20 so as to change and determine the angular position of the bracket device 100 relative to the frame 20.

The bracket device 100 further includes an angle adjustment structure 80 for adjusting the angle of the fastener element 60 and the angle of the bracket device 100. The angle adjustment structure 80 includes a pin 82 provided in one of the fastener element 60 and the bracket device 100 and a hole 84 provided in the other one of the fastener element 60 and the bracket device 100. The pin 82 includes a first pin 82A and a second pin 82B. The hole 84 includes a first hole 84A for receiving the first pin 82A and a second hole 84B for receiving the second pin 82B. The pin 82 is arranged in the second arm 106 of the bracket device 100. The hole 84 is provided in an engagement tubular portion 62A configured to threadedly engage with the tubular portion 62 of the fastener element 60. A contact surface is formed at a side of the pin 82 that is closer to the center axis plane to contact the rear-wheel hub shaft HB of the bicycle 10. The hub shaft presses the contact surface so that separation of the pin 82 from the hole 84 is restricted.

Modifications

The description related with the above embodiments exemplifies, without any intention to limit, an applicable form of a rear derailleur according to the present disclosure. In addition to the embodiments described above, the rear derailleur according to the present disclosure is applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

As shown in FIGS. 15 to 18, a distance measurement tool 90 can be included for measuring the distance between the chain guide arrangement 48 and the rear sprocket assembly 26A to set an appropriate distance between the rear sprocket assembly 26A and the chain guide arrangement 48 of the rear derailleur 40. The distance between the rear sprocket assembly 26A and the chain guide arrangement 48 is defined by the distance from the tip of a tooth of the rear sprocket 26 to the tip of at least one plate of the chain guide arrangement 48. The distance between the rear sprocket assembly 26A and the chain guide arrangement 48 is defined by the distance from the tip of a tooth of the rear sprocket 26 to the tip of the outer plate P1.

Figure 15:
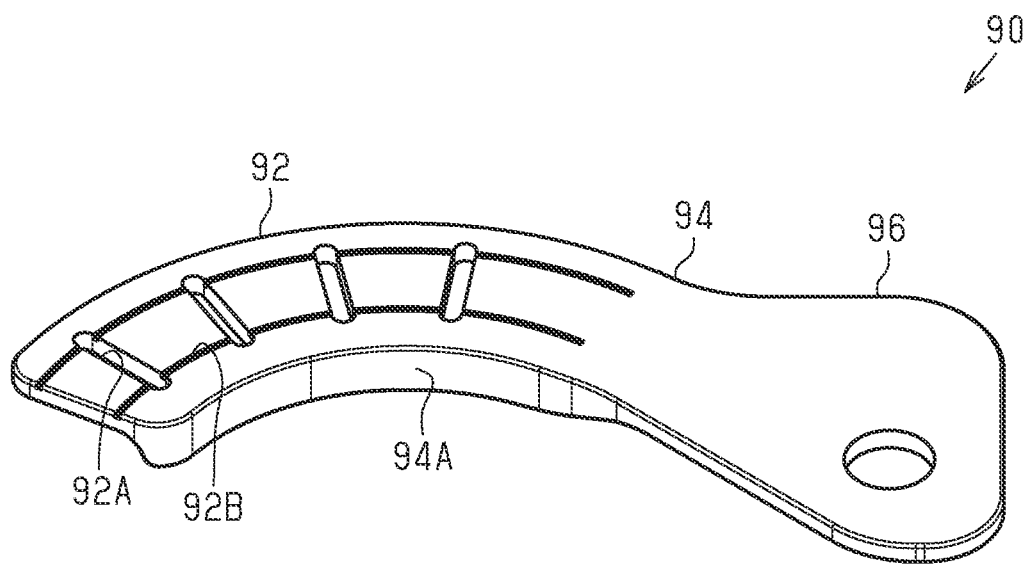
FIG. 15 is a perspective view of a distance measurement tool as viewed from the front.
Figure 16:
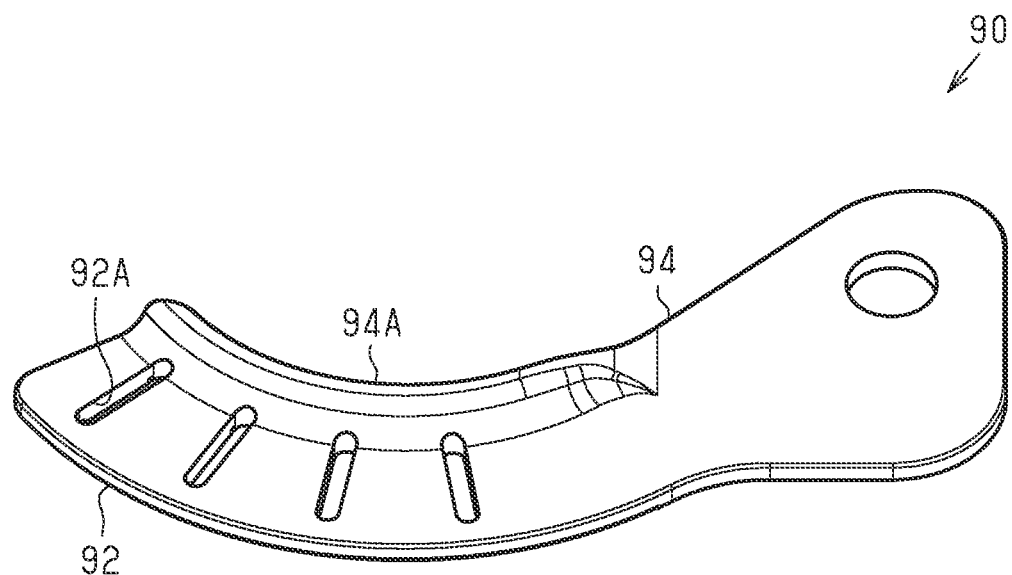
FIG. 16 is a perspective view of the distance measurement tool as viewed from the rear.

As shown in FIGS. 15 and 16, the distance measurement tool 90 includes a body 92, a connecting portion 94, and a holding portion 96. The body 92 includes openings 92A and slits 92B. The slits 92B are discontinuous because of the openings 92A. The openings 92A intersect the slits 92B. Thus, the positions of the rear sprocket assembly 26A and the slits 92B can be adjusted by looking through the openings 92A regardless of the material of the body 92. In an example, the body 92 is formed from a resin that is transparent, translucent, or opaque. Each slit 92B is formed in correspondence with a rear sprocket of the rear sprocket assembly 26A. Each slit 92B is formed in correspondence with at least one rear sprocket, having a certain number of teeth, of the rear sprocket assembly 26A. Each slit 92B is formed in correspondence with the number of teeth of a rear sprocket included in the rear sprocket assembly 26A. A plurality of slits 92B are formed in correspondence with a plurality of rear sprockets, each having a certain number of teeth, of the rear sprocket assembly 26A. The body 92 includes marking indicating the number of teeth of the rear sprocket 26 corresponding to each slit 92B in a state in which the distance measurement tool 90 is held in contact with the chain guide arrangement 48.

The connecting portion 94 connects the holding portion 96 and the body 92. At least one of the body 92 and the connecting portion 94 includes a contact portion 94A that contacts the plate of the chain guide arrangement. At least one of the body 92 and the connecting portion 94 includes the contact portion 94A that contacts the outer plate P1. The body 92 includes the contact portion 94A that contacts the outer plate P1. The contact portion 94A contacts part of the outer plate P1. The contact portion 94A can include, for example, a recess in correspondence with a projection on the outer plate P1. The slits 92B are formed to correspond to the rear sprockets included in the rear sprocket assembly 26A in a state in which the contact portion 94A of the distance measurement tool 90 contacts the outer plate P1. The body 92 includes markings indicating the number of teeth of the rear sprockets 26 corresponding to the slits 92B in a state in which the contact portion 94A of the distance measurement tool 90 is held in contact with the outer plate P1.

Figure 17:
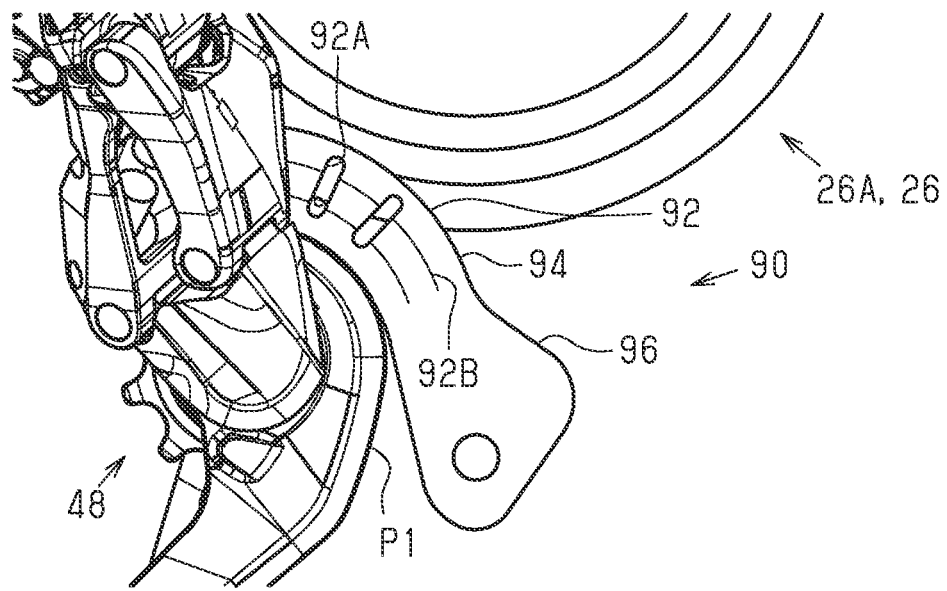
FIG. 17 is a side view showing the distance measurement tool coupled to a rear derailleur.
Figure 18:
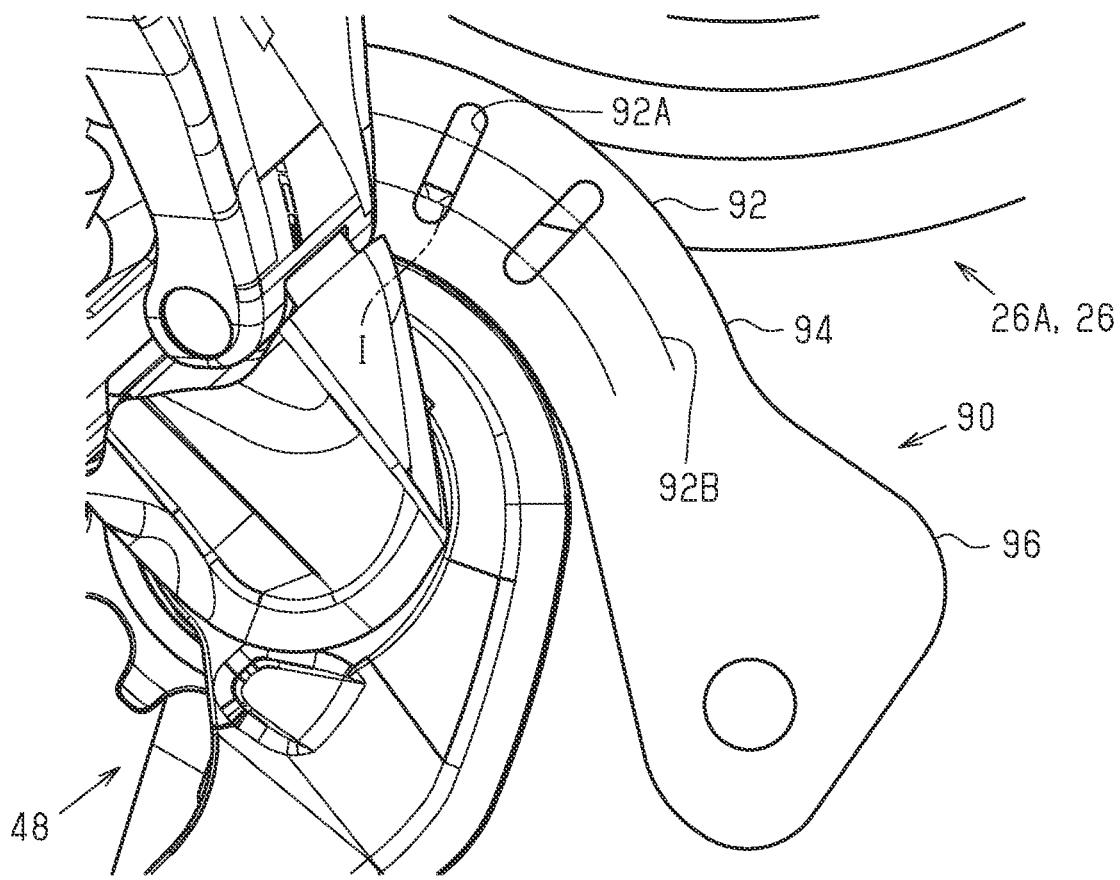
FIG. 18 is an enlarged view showing part of the rear derailleur and the distance measurement tool of FIG. 17.

A method for measuring distance using the distance measurement tool 90 will now be described with reference to FIGS. 17 and 18. A user brings the contact portion 94A of the distance measurement tool 90 into contact with the edge of the outer plate P1 of the chain guide arrangement 48. Then, the user aligns a slit 92B with the tip of a tooth of a rear sprocket 26 while looking through the openings 92A. In a state in which the distance measurement tool 90 is in contact with the outer plate P1, the user aligns the tip of a tooth of the rear sprocket 26 with the slit 92B in a radial direction with respect to the center axis of the rear sprocket 26. Specifically, as shown in FIG. 18, the user aligns the tip of a tooth of the rear sprocket 26 with an imaginary line I extending from the slit 92B through the opening 92A. In a case where the tip of the tooth of the rear sprocket 26 is not aligned with the slit 92B, the user adjusts the angular position of the rear derailleur 40 relative to the frame 20 of the bicycle 10. After the tip of the tooth of the rear sprocket assembly 26A is aligned with the slit 92B, the user determines the angle of the rear derailleur 40 relative to the frame 20 using the angular position adjustment structure 54.

The angle adjustment structure 80 can be included in the rear derailleur 40 of the first to third embodiments. The contact surface of the angle adjustment structure 80 can be formed from a flexible member. In a case where the contact surface is formed from a flexible member, a force applied by the rear-wheel hub shaft HB of the bicycle 10 deforms the flexible member. Thus, even in a case where a plurality of pins 82 are disposed at different positions in the axial direction, the pins 82 will not be separated from the holes 84.

The rear derailleur 40 can include a motor unit that has a motor. The motor unit actuates the rear derailleur 40. The motor unit is provided on at least one of the base element 42, the movable element 44, and the link mechanism 46. The motor unit is supplied with electric power from the battery 36. The motor unit can further include a wireless communication unit. The motor unit can receive a transmission signal from a shifter provided on the handlebar 34 with the wireless communication unit. Alternatively, the motor unit can receive a transmission signal via a controller provided on the battery 36 through wired communication.

The base element 42 of the rear derailleur 40 can include a recess to support at least part of the bolt member 56. In an example, the recess supports the head 56B of the bolt member 56. The angular position adjustment structure 54 does not have to include the structure of the first threaded portion 56A and the second threaded portion 58A. In this case, instead of the bolt member 56, an insertion member can be inserted into the adjustment opening 58 to contact the contact surface 20A. The insertion member is formed from a metal.

Figure 19:
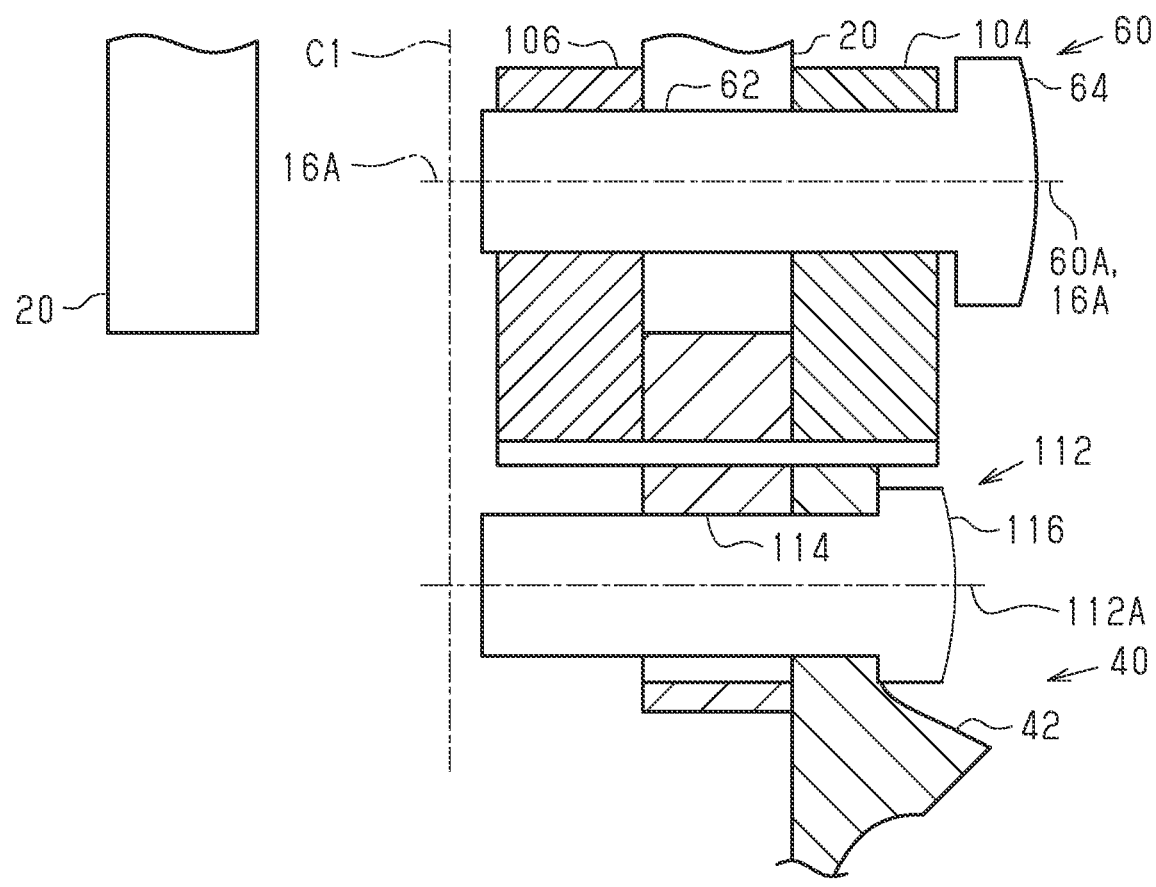
FIG. 19 is a schematic diagram showing a modification of a base element coupled to a bracket device.

In the rear derailleur 40 that is coupled to the bracket device 100 in accordance with the fourth embodiment, the structure of the first attachment end 42A can be changed. One of the first arm 50 and the second arm 52 is omitted from the first attachment end 42A. In the example shown in FIG. 19, the second arm 52 is omitted from the first attachment end 42A.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A bracket device for mounting a bicycle rear derailleur including a base element, a movable element, and a linkage mechanism on a rear-wheel axis of a bicycle, the bracket device comprising:
   a frame attachment end configured to be coupled to a frame of the bicycle; and
   a derailleur attachment end configured to be coupled to the bicycle rear derailleur;
   the frame attachment end having a first arm and a second arm, which are arranged so as to be spaced apart from each other in an axial direction with respect to the rear-wheel axis;
   the first arm having a first attachment opening through which the rear-wheel axis coaxially passes in a mounted state of the bracket device;
   the second arm having a second attachment opening through which the rear-wheel axis coaxially passes in the mounted state of the bracket device; and
   a third arm attached to the first and second arms,
   the derailleur having a third attachment opening configured to receive a derailleur fastener for coupling to the base element of the bicycle rear derailleur, the third arm having the third attachment opening.

2. The bracket device according to claim 1, wherein the third attachment opening is at least partly disposed between the first attachment opening and the second attachment opening in the axial direction.

3. The bracket device according to claim 2, wherein the third attachment opening is entirely disposed between the first attachment opening and the second attachment opening in the axial direction.

4. The bracket device according to claim 3, wherein the second arm is disposed closer to an axial center plane of the bicycle than the first arm in a mounted state of the bicycle rear derailleur.

5. The bracket device according to claim 3, wherein the first arm and the second arm are configured to dispose the frame of the bicycle between the first arm and the second arm in the axial direction with respect to the rear-wheel axis in a mounted state of the bicycle rear derailleur.

6. The bracket device according to claim 3, further comprising:
   a frame fastener element configured to fix the frame attachment end to the frame of the bicycle such that a fastener center axis of the frame fastener element and the rear-wheel axis are coaxial in a mounted state of the bicycle rear derailleur.

7. The bracket device according to claim 6, wherein the frame fastener element has a tubular portion and a radially projecting portion with respect to the fastener center axis; and
   the radially projecting portion extends radially outwardly from one axial end of the tubular portion with respect to the fastener center axis.

8. The bracket device according to claim 7, wherein the first attachment opening is configured such that the tubular portion of the frame fastener element passes through.

9. The bracket device according to claim 8, wherein the second attachment opening is configured such that the tubular portion of the frame fastener element at least partly passes through.

10. The bracket device according to claim 3, further comprising:
    an angular position adjustment structure configured to adjust an angular position of the bracket device with respect to the frame of the bicycle.

11. The bracket device according to claim 10, wherein the angular position adjustment structure includes a bolt member having a first threaded portion and an adjustment opening having a second threaded portion that threadedly engages with the first threaded portion.

12. The bracket device according to claim 1, wherein an axial position of the third attachment opening is at least partly disposed between an axial position of the first attachment opening and an axial position of the second attachment opening.

13. The bracket device according to claim 1, wherein the third attachment opening is at least partly disposed between a first derailleur arm of the base element and a second derailleur arm of the base element in a state where the derailleur attachment end is coupled to the bicycle rear derailleur.

14. A bracket device for mounting a bicycle rear derailleur including a base element, a movable element, and a linkage mechanism on a rear-wheel axis of a bicycle, the bracket device comprising:
   a frame attachment end configured to be coupled to a frame of the bicycle; and
   a derailleur attachment end configured to be coupled to the bicycle rear derailleur,
   the frame attachment end having a first arm and a second arm arranged so as to be spaced apart from each other in an axial direction with respect to the rear-wheel axis such that the frame can be disposed between the first arm and the second arm in a mounted state of the bracket device, the first arm being integrally formed with the second arm as a one-piece member,
   the first arm having a first attachment opening through which the rear-wheel axis coaxially passes in the mounted state of the bracket device,
   the second arm having a second attachment opening through which the rear-wheel axis coaxially passes in the mounted state of the bracket device,
   the derailleur attachment end further having a third attachment opening configured to receive a derailleur fastener for coupling to the base element of the bicycle rear derailleur, and
   an axial position of the third attachment opening being at least partly disposed between an axial position of the first attachment opening and an axial position of the second attachment opening.

15. The bracket device according to claim 14, wherein the third attachment opening is entirely disposed between the first attachment opening and the second attachment opening.

16. The bracket device according to claim 14, wherein the first arm and the second arm are configured to abut against opposing sides of the frame of the bicycle such that the frame is disposed between the first arm and the second arm in the axial direction.

17. A bracket device for mounting a bicycle rear derailleur including a base element, a movable element, and a linkage mechanism on a rear-wheel axis of a bicycle, the bracket device comprising:
   a frame attachment end configured to be coupled to a frame of the bicycle; and
   a derailleur attachment end configured to be coupled to the bicycle rear derailleur, the frame attachment end having a first arm and a second arm arranged so as to be spaced apart from each other in an axial direction with respect to the rear-wheel axis, the first arm having a first attachment opening through which the rear-wheel axis coaxially passes in a mounted state of the bracket device, the second arm having a second attachment opening through which the rear-wheel axis coaxially passes in the mounted state of the bracket device, the derailleur attachment end having a third attachment opening configured to receive a derailleur fastener for coupling to the base element of the bicycle rear derailleur, and the third attachment opening being at least partly disposed between a first derailleur arm of the base element and a second derailleur arm of the base element in a state where the derailleur attachment end is coupled to the bicycle rear derailleur.

18. The bracket device according to claim 17, wherein the third attachment opening is entirely disposed between the first derailleur arm and the second derailleur arm in the state where the derailleur attachment end is coupled to the bicycle rear derailleur.

* * * * *